(12) United States Patent
Nagashima et al.

(10) Patent No.: US 6,271,336 B2
(45) Date of Patent: Aug. 7, 2001

(54) PROCESS FOR PRODUCING AROMATIC-ALIPHATIC COPOLYCARBONATE

(75) Inventors: Hiromitsu Nagashima; Shu Yoshida; Satoshi Nagai; Yoshinori Isahaya, all of Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/725,863

(22) Filed: Nov. 30, 2000

(30) Foreign Application Priority Data

Nov. 30, 1999 (JP) .................................................. 11-341171

(51) Int. Cl.⁷ .................................................. C08G 64/00
(52) U.S. Cl. ........................................... 528/196; 528/198
(58) Field of Search ...................................... 528/196, 198

(56) References Cited

FOREIGN PATENT DOCUMENTS 64-66234 * 1/1999 (JP) .

\* cited by examiner

*Primary Examiner*—Terressa M. Boykin
(74) *Attorney, Agent, or Firm*—Sughrue, Mion, Zinn, Macpeak & Seas, PLLC

(57) ABSTRACT

A process for producing an aromatic-aliphatic copolycarbonate which is excellent in impact resistance and heat resistance and has large Abbe number, small photoelasticity constant, and excellent color tone. The process comprises conducting polycondensation in a reactor made of a stainless steel comprising at least 12 wt % nickel, at least 22 wt % chromium, and at least 50 wt % iron.

4 Claims, No Drawings

PROCESS FOR PRODUCING AROMATIC-ALIPHATIC COPOLYCARBONATE

FIELD OF THE INVENTION

The present invention relates to a process for producing a transparent aromatic-aliphatic copolycarbonate having impact resistance, high refractive index, large Abbe number, small photoelasticity constant, and excellent hue. This polycarbonate resin can advantageously be used as an optical material in applications such as various lenses, prisms, optical disk substrates, and optical fibers.

DESCRIPTION OF THE RELATED ART

Polycarbonates obtained by the interfacial polymerization of an aromatic dihydroxy compound such as 2,2-bis(4-hydroxyphenyl)propane (commonly called "bisphenol A") with phosgene in the presence of an acid acceptor are excellent not only in mechanical properties including impact resistance but in heat resistance and transparency. These polycarbonates are hence used as optical materials in applications such as various lenses, prisms, and optical disk substrates.

However, the polycarbonate obtained using only bisphenol A as the aromatic dihydroxy compound has a large photoelasticity constant and relatively poor melt flowability and, hence, gives moldings having enhanced birefringence. In addition, this polycarbonate has an Abbe number as small as 30, although its refractive index is as high as 1.58. Because of these, the bisphenol A polycarbonate does not always have performances sufficient for applications such as optical recording materials and optical lenses.

A copolycarbonate obtained from bisphenol A and tricyclo [5.2.1.0$^{2,6}$] decanedimethanol (hereinafter referred to as "TCDDM") has been proposed in order to eliminate such drawbacks of the bisphenol A polycarbonate (see JP-A-64-66234). (The term "JP-A" as used herein means an "unexamined published Japanese patent application".) Since this aromatic-aliphatic copolycarbonate has excellent impact and heat resistance and further has a small photoelasticity constant and a large Abbe number, it can be extensively used as an optical material. However, it is difficult to produce this aromatic-aliphatic copolycarbonate by the ordinary phosgene method, and this polycarbonate is produced by a method known as a transesterification method. Specifically, an aromatic dihydroxy compound, an aliphatic dihydroxy compound, and a carbonic diester such as diphenyl carbonate are condensation-polymerized in a molten state by transesterification to produce the copolycarbonate.

In thus producing the aromatic-aliphatic copolycarbonate by transesterification, the polycondensation is conducted while heating the reactants at a temperature of from 200 to 300° C. Because of the heat history in which the polymer being yielded is exposed to such a high temperature for a long period of time, the color tone and other properties of the polymer deteriorate. It has therefore been difficult to obtain the copolycarbonate of excellent quality. In particular, in the case of using a stainless-steel reactor, deterioration in color tone is unavoidable even when techniques such as shortening the reaction time and lowering the reaction temperature are fully utilized. Namely, the aromatic-aliphatic polycarbonate produced industrially has been unsuitable for use in the fields where an excellent color tone is required.

SUMMARY OF THE INVENTION

The present invention has been made to overcome the problems of conventional techniques described above.

Accordingly, an object of the invention is to provide a process for producing an aromatic-aliphatic polycarbonate which is excellent in impact resistance and heat resistance and has large Abbe number, small photoelasticity constant, and excellent color tone.

As a result of intensive investigations to overcome the problems described above, it has been found that in producing an aromatic-aliphatic copolycarbonate by subjecting an aromatic dihydroxy compound represented by the following formula (1), TCDDM represented by the following formula (2), and a carbonic diester to melt polycondensation, an aromatic-aliphatic copolycarbonate resin having an excellent color tone is obtained by conducting the melt polycondensation in a reactor made of a stainless steel comprising at least 12 wt % nickel, at least 22 wt % chromium, and at least 50 wt % iron. The invention has been achieved based on this finding.

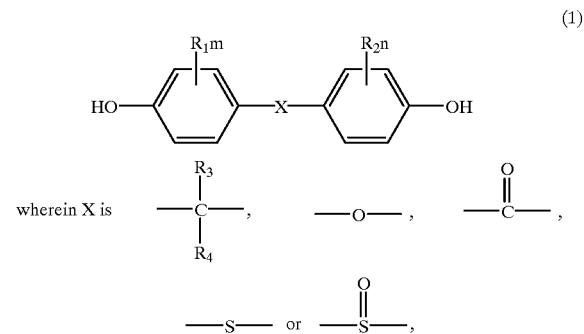

$R_1$ and $R_2$ each represent a hydrogen atom, an alkyl group having 1 to 10 carbon atoms, or a halogen atom; m and n, each indicating the number of substituents, each are an integer of 0 to 4; and $R_3$ and $R_4$ each represent a hydrogen atom, an alkyl group having 1 to 10 carbon atoms, or a phenyl group, provided that $R_3$ and $R_4$ may be bonded to each other to form a ring.

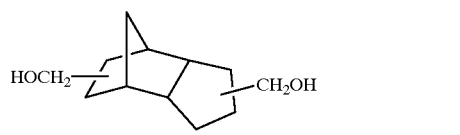

DETAILED DESCRIPTION OF THE INVENTION

The process for producing an aromatic-aliphatic copolycarbonate resin of the invention will be explained in detail below.

The reactor for use in the invention is made of a stainless steel comprising at least 12 wt % nickel, at least 22 wt % chromium, and at least 50 wt % iron. This stainless steel may further contain elements such as carbon, molybdenum, manganese, silicon, phosphorus, and sulfur. Examples of the stainless steel for use in the invention include the following types according to JIS standards: SUH309 (nickel content: 12.0–15.0 wt %; chromium content: 22.0–24.0 wt %; iron content: at least 57.73 wt %), SUS309S (nickel content: 12.0–15.0 wt %; chromium content: 22.0–24.0 wt %; iron content: at least 57.845 wt %), SUH310 (nickel content: 19.0–22.0 wt %; chromium content: 24.0–26.0 wt %; iron content: at least 51.18 wt %), and SUS310S (nickel content:

19.0–22.0 wt %; chromium content: 24.0–26.0 wt %; iron content: at least 51.345 wt %). However, the stainless steels that can be used in the invention should not be construed as being limited to these examples.

The term "reactor" as used herein should not be construed as being limited to a polymerization vessel, and may include all parts which come into contact with substances participating in the reaction, such as the reaction mixture and/or by-products of the reaction and/or feed materials. Examples of such parts include a feed material melting vessel, polymerization vessel, reaction mixture stirring blades, reflux column, gear pump for polymer discharge, and pipings connecting these components. However, the reactor should not be construed as being limited thereto.

The aromatic-aliphatic copolycarbonate obtained by the melt polycondensation of an aromatic dihydroxy compound represented by formula (1), TCDDM represented by formula (2), and a carbonic diester comprises structural units derived from the aromatic dihydroxy compound, which are represented by the following formula (4) (these units are hereinafter referred to as "I") and structural units derived from TCDDM, which are represented by the following formula (5) (these units are hereinafter referred to as "II"). This copolycarbonate is a random, block, or alternating copolymer, and is useful as an optical material excellent in impact resistance, heat resistance, and balance between refractive index and Abbe number.

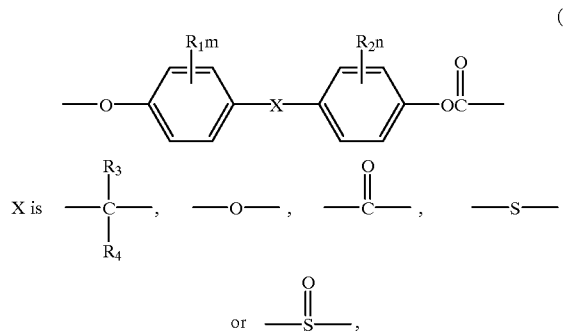

$R_1$ and $R_2$ each represent a hydrogen atom, an alkyl group having 1 to 10 carbon atoms, or a halogen atom; m and n, each indicating the number of the substituent, each are an integer of 0 to 4; and $R_3$ and $R_4$ each represent a hydrogen atom, an alkyl group having 1 to 10 carbon atoms, or a phenyl group, provided that $R_3$ and $R_4$ may be bonded to each other to form a ring.

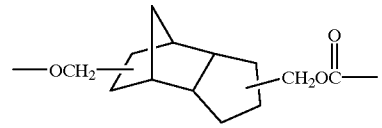

In the invention, the molar ratio of the structural units derived from the aromatic dihydroxy compound and those derived from TCDDM (I/II) is preferably from 90/10 to 10/90, more preferably from 80/20 to 20/80. If the molar ratio of the structural units derived from the aromatic dihydroxy compound and those derived from TCDDM (I/II) in the aromatic-aliphatic polycarbonate is lower than 10/90, this polycarbonate has poor heat resistance. On the other hand, if the molar ratio thereof is higher than 90/10, this polycarbonate has large photoelasticity constant, high water absorption and impaired balance between refractive index and Abbe number, and is hence undesirable for use as an optical material.

The aromatic-aliphatic copolycarbonate according to the invention has a weight average molecular weight of preferably from 20,000 to 200,000, more preferably from 40,000 to 100,000.

This aromatic-aliphatic copolycarbonate resin is produced by the melt polycondensation method. Namely, an aromatic dihydroxy compound represented by formula (1), TCDDM represented by formula (2), a carbonic diester, and a catalyst are used to conduct melt polycondensation with heating at ordinary or a reduced pressure while removing by-products. The reactions are generally conducted in two or more steps.

Specifically, the first-stage reaction is conducted at a temperature of generally from 120 to 260° C., preferably from 180 to 240° C., for generally from 0 to 5 hours, preferably from 0.5 to 3 hours. Subsequently, the reactants are further reacted while elevating the degree of vacuum of the reaction system. Finally, polycondensation is conducted at a pressure of 1 mmHg or lower and a temperature of from 200 to 300° C. The reactor for use in conducting these reactions may be of the vessel type or extruder type.

The proportion of the aromatic dihydroxy compound represented by formula (1) to TCDDM represented by formula (2) is not particularly limited. However, the aromatic dihydroxy compound represented by formula (1) and the TCDDM represented by formula (2) are used generally in amounts of from 10 to 90 mol % and from 90 to 10 mol %, respectively, per mole of the sum of those compounds.

The polymerization catalyst used is one or more basic compounds. Representative examples thereof include alkali metal compounds, alkaline earth metal compounds, and nitrogen-containing compounds. These compounds can be used alone or in combination of two or more thereof.

Examples of the alkali metal compounds include organic acid salts, inorganic acid salts, oxides, hydroxides, hydrides, and alcoholates of alkali metals. Specific examples thereof include sodium hydroxide, potassium hydroxide, cesium hydroxide, lithium hydroxide, sodium hydrogen carbonate, potassium hydrogen carbonate, lithium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, lithium borohydride, phenylated sodium borate, sodium benzoate, potassium benzoate, cesium benzoate, lithium benzoate, disodium hydrogen phosphate, dipotassium hydrogen phosphate, dilithium hydrogen phosphate, disodium phenyl phosphate, dipotassium phenyl phosphate, dilithium phenyl phosphate, the disodium salt, dipotassium salt, dicesium salt, and dilithium salt of bisphenol A, and the sodium salt, potassium salt, cesium salt, and lithium salt of phenol.

Examples of the alkaline earth metal compounds include organic acid salts, inorganic acid salts, oxides, hydroxides, hydrides, and alcoholates of alkaline earth metals. Specific examples thereof include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

Examples of the nitrogen-containing compounds include quaternary ammonium hydroxides, quaternary ammonium salts, and amines. Specific examples thereof include ammonium hydroxides having alkyl, aryl, or alaryl groups or the like, such as tetramethylammonium hydroxide, tetraethylammonium hydroxide, tetrapropylammonium hydroxide, tetrabutylammonium hydroxide, and trimethylbenzylammonium hydroxide; tertiary amines such as trimethylamine, triethylamine, dimethylbenzylamine, and triphenylamine; secondary amines such as dimethylamine and diethylamine; primary amines such as methylamine and ethylamine; imidazole derivatives such as 2-methylimidazole and 2-phenylimidazole; ammonia; and basic salts such as tetramethylammonium borohydride, tetrabutylammonium borohydride, tetrabutylammonium tetraphenylborate, and tetramethylammonium tetraphenylborate.

These catalysts are used in an amount of generally from $10^{-9}$ to $10^{-3}$ mol, preferably from $10^{-7}$ to $10^{-5}$ mol, per mole of the sum of the aromatic dihydroxy compound represented by formula (1) and the TCDDM represented by formula (2).

Examples of the aromatic dihydroxy compound represented by formula (1) include bis(4-hydroxyphenyl) methane, 1,1-bis(4-hydroxyphenyl)ethane, 2,2-bis(4-hydroxyphenyl)propane (bisphenol A), 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-t-butylphenyl) propane, 2,2-bis(4-hydroxy-3-bromophenyl)propane, 1,1-bis(4-hydroxyphenyl)cyclopentane, 1,1-bis(4-hydroxyphenyl)cyclohexane (commonly called "bisphenol Z"), 4,4'-dihydroxydiphenyl ether, 4,4'-dihydroxy-3,3'-dimethyldiphenyl ether, 4,4'-dihydroxydiphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenyl sulfone, and 4,4'-dihydroxy-3,3'-dimethyldiphenyl sulfone. Especially preferred of these are 2,2-bis(4-hydroxyphenyl) propane (bisphenol A) and 1,1-bis(4-hydroxyphenyl) cyclohexane (bisphenol Z).

Examples of the carbonic diester include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate. Especially preferred of these is diphenyl carbonate. Diphenyl carbonate is used in an amount of preferably from 0.97 to 1.20 mol, more preferably from 0.99 to 1.10 mol, per mol of the sum of the aromatic dihydroxy compound represented by formula (1) and the TCDDM represented by formula (2).

It is preferred to remove or deactivate the catalyst in order to enable the polycarbonate resin produced by the invention to retain thermal stability and hydrolytic stability. A preferred method generally used is to deactivate the transesterification catalyst, e.g., an alkali metal or alkaline earth metal catalyst, by neutralizing it with a known acid substance. Preferred examples of the acid substance include inorganic acids such as phosphoric acid, phosphorous acid, hypophosphorous acid, and boric acid, aromatic sulfonic acids such as p-toluenesulfonic acid, aromatic sulfonic esters such as butyl p-toluenesulfonate, organic halides such as stearoyl chloride, butyryl chloride, benzoyl chloride, and toluenesulfonyl chloride, alkyl sulfates such as dimethyl sulfate, and organic halides such as benzyl chloride.

After the catalyst deactivation, a step may be conducted in which low-boiling compounds present in the polymer are removed by evaporation at a pressure of from 0.1 to 1 mmHg and a temperature of from 200 to 300° C. For this purpose, a horizontal kneading machine equipped with paddle, grid, or spectacle blades or the like or a thin-film evaporator is advantageously used.

Besides the catalyst deactivator, other ingredients can be added in the invention, such as an antioxidant, pigment, dye, reinforcement or filler, ultraviolet absorber, lubricant, release agent, nucleating agent, plasticizer, flow modifier, and antistatic agent. Furthermore, the polycarbonate produced by the invention may be blended with another polycarbonate resin or thermoplastic resin for the purpose of further improving resin properties.

For incorporating those additives into the polycarbonate resin, a conventional method can be used. For example, there may suitably be used a method in which the ingredients are dispersed and mixed together by means of a tumbling mixer, Henschel mixer, ribbon blender, or high-speed mixer represented by a supermixer and then melt-kneaded with an extruder, Banbury mixer, roll mill, or the like.

According to the invention, it has become possible to industrially obtain an aromatic-aliphatic polycarbonate having an excellent color tone. This polycarbonate can be stably provided as a material which has an excellent balance between refractive index and dispersion and an excellent photoelasticity constant and retaining intact properties such as impact resistance and heat resistance, for use in optical plastic-material applications such as various lenses, prisms, and optical-disk substrates.

The invention will be explained in more detail below by reference to Examples, but the invention should not be construed as being limited to the following Examples in any way. Properties of each copolycarbonate obtained were examined by the following methods.

(1) Weight Average Molecular Weight: Measured by GPC (Shodex System-21; column temperature: 40° C.) using chloroform as a solvent.

(2) YI (yellowness index): Each polymer was press-molded into a disk having a diameter of 50 mm and a thickness of 2 mm, and the disk was examined with a color difference meter (SE-2000, manufactured by Nippon Denshoku Kogyo K.K.).

EXAMPLE 1

Into a 300-cc separable flask made of SUS310S equipped with a stirrer and a device for removal by distillation were introduced 26.8 g (0.10 mol) of BPZ (bisphenol Z), 19.6 g (0.10 mol) of TCDDM (tricyclo [$5.2.1.0^{2,6}$] decanedimethanol), 43.3 g (0.202 mol) of diphenyl carbonate, and $6.0 \times 10^{-7}$ mol of sodium hydrogen carbonate. The contents were heated at 180° C. with stirring for 30 minutes in a nitrogen atmosphere.

Thereafter, the pressure in the flask was reduced to 150 mmHg and, simultaneously therewith, the reaction mixture was heated to 200° C. at a rate of 60° C./hr to conduct a transesterification reaction. The reaction mixture was further heated to 240° C. and maintained at this temperature for 10 minutes, while removing the phenol by distillation. Subsequently, the pressure in the flask was reduced to 1 mmHg or lower over 40 minutes. The reaction was thus conducted with stirring for 4 hours in total. After completion of the reaction, nitrogen was introduced into the reactor to return the internal pressure to ordinary pressure, and the polycarbonate yielded was taken out. Properties of this aromatic-aliphatic copolycarbonate and properties of the apparatus material are shown in Tables 1 and 2, respectively.

EXAMPLE 2

The same procedure as in Example 1 was conducted, except that the 300-cc separable flask, stirrer, and device for removal by distillation were replaced with ones made of SUH309. Thus, a polycarbonate was obtained. Properties of this aromatic-aliphatic copolycarbonate and properties of the apparatus material are shown in Tables 1 and 2, respectively.

EXAMPLE 3

The same procedure as in Example 1 was conducted, except that the amounts of the BPZ and TCDDM introduced were changed to 21.4 g (0.08 mol) and 23.5 g (0.12 mol), respectively, and that the 300-cc separable flask, stirrer, and device for removal by distillation were replaced with ones made of SUS309S. Thus, a polycarbonate was obtained. Properties of this aromatic-aliphatic copolycarbonate and properties of the apparatus material are shown in Tables 1 and 2, respectively.

EXAMPLE 4

The same procedure as in Example 1 was conducted, except that the amounts of the BPZ and TCDDM introduced were changed to 32.2 g (0.12 mol) and 15.7 g (0.08 mol), respectively, and that the 300-cc separable flask, stirrer, and device for removal by distillation were replaced with ones made of SUS310. Thus, a polycarbonate was obtained. Properties of this aromatic-aliphatic copolycarbonate and properties of the apparatus material are shown in Tables 1 and 2, respectively.

EXAMPLE 5

The same procedure as in Example 1 was conducted, except that 22.8 g (0.10 mol) of BPA (bisphenol A) was used in place of 26.8 g of BPZ. Thus, a polycarbonate was obtained. Properties of this aromatic-aliphatic copolycarbonate and properties of the apparatus material are shown in Tables 1 and 2, respectively.

Comparative Example 1

The same procedure as in Example 1 was conducted, except that the 300-cc separable flask, stirrer, and device for removal by distillation were replaced with ones made of SUS304. Thus, a polycarbonate was obtained. Properties of this aromatic-aliphatic copolycarbonate and properties of the apparatus material are shown in Tables 1 and 2, respectively.

Comparative Example 2

The same procedure as in Example 1 was conducted, except that the amounts of the BPZ and TCDDM introduced were changed to 21.4 g (0.08 mol) and 23.5 g (0.12 mol), respectively, and that the 300-cc separable flask, stirrer, and device for removal by distillation were replaced with ones made of SUS301. Thus, a polycarbonate was obtained. Properties of this aromatic-aliphatic copolycarbonate and properties of the apparatus material are shown in Tables 1 and 2, respectively.

TABLE 1

|  | Material | TCDDM/BPZ molar ratio | Weight average molecular weight | YI |
| --- | --- | --- | --- | --- |
| Example 1 | SUS310S | 50/50 | 59000 | 1.40 |
| Example 2 | SUH309 | 50/50 | 60000 | 1.44 |
| Example 3 | SUS309S | 60/40 | 59000 | 1.41 |
| Example 4 | SUH310 | 40/60 | 59000 | 1.40 |
| Example 5 | SUS310S | 50/50 (BPA) | 58000 | 1.39 |
| Comparative Example 1 | SUS304 | 50/50 | 57000 | 2.05 |
| Comparative Example 2 | SUS301 | 60/40 | 57000 | 3.59 |

TABLE 2

|  | Material | Ni content (%) | Cr content (%) | Fe content (%) |
| --- | --- | --- | --- | --- |
| Example 1 | SUS310S | 20 | 25 | 53 |
| Example 2 | SUH309 | 13 | 23 | 61 |
| Example 3 | SUS309S | 13 | 23 | 62 |
| Example 4 | SUH310 | 20 | 25 | 52 |
| Example 5 | SUS310S | 20 | 25 | 53 |
| Comparative Example 1 | SUS304 | 9 | 19 | 70 |
| Comparative Example 2 | SUS301 | 7 | 17 | 74 |

According to the invention, an aromatic-aliphatic copolycarbonate having large Abbe number, small photoelasticity constant, and excellent color tone can be synthesized in large quantities using an inexpensive production apparatus. This copolycarbonate can be provided for use in the fields of a wide variety of optical transparent materials such as various optical lenses, in particular, spectacle lenses required to have an excellent color tone, prisms, optical-disk substrates, and optical fibers.

What is claimed is:

1. A process for producing an aromatic-aliphatic copolycarbonate which comprises subjecting an aromatic dihydroxy compound represented by the following formula (1), tricyclo [$5.2.1.0^{2,6}$] decanedimethanol represented by the following formula (2), and a carbonic diester to melt polycondensation to produce an aromatic-aliphatic copolycarbonate, wherein the melt polycondensation is conducted in a reactor made of a stainless steel comprising at least 12 wt % nickel, at least 22 wt % chromium, and at least 50 wt % iron:

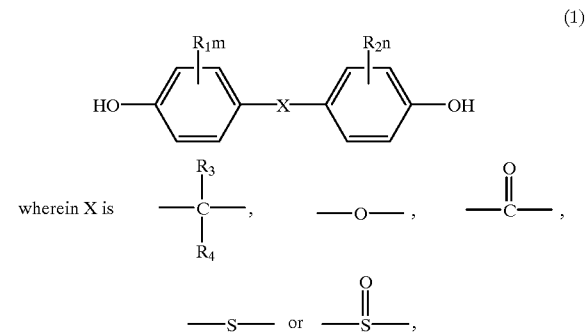

$R_1$ and $R_2$ each represent a hydrogen atom, an alkyl group having 1 to 10 carbon atoms, or a halogen atom; m and n, each indicating the number of substituents, each are an integer of 0 to 4; and $R_3$ and $R_4$ each represent a hydrogen atom, an alkyl group having 1 to 10 carbon atoms, or a phenyl group, provided that $R_3$ and $R_4$ may be bonded to each other to form a ring.

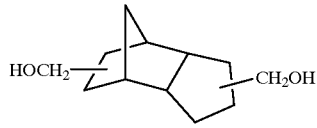
(2)

2. The process for producing an aromatic-aliphatic copolycarbonate of claim 1, wherein the reactor is made of a stainless steel comprising 12 to 22 wt % nickel, 22 to 26 wt % chromium, and at least 50 wt % iron.

3. The process for producing an aromatic-aliphatic copolycarbonate of claim 1, wherein the aromatic dihydroxy compound represented by formula (1) and the tricyclo [5.2.1.0$^{2,6}$] decanedimethanol (TCDDM) represented by formula (2) are used in proportions of from 90 to 10 mol % and from 10 to 90 mol %, respectively, per mole of the sum of the aromatic dihydroxy compound represented by formula (1) and the TCDDM represented by formula (2).

4. The process for producing an aromatic-aliphatic copolycarbonate of claim 1, wherein the aromatic dihydroxy compound represented by formula (1) is 1,1-bis(4-hydroxyphenyl)cyclohexane represented by the following formula (3):

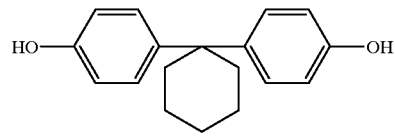
(3)

* * * * *